US000001163H

United States Statutory Invention Registration [19]

[11] Reg. Number: H1163

Bone

[43] Published: Apr. 6, 1993

[54] PIPELINE REPAIR METHOD

[76] Inventor: Lee Bone, 3413 Sage Brush Trail, Plano, Tex. 75023

[21] Appl. No.: 620,794

[22] Filed: Dec. 3, 1990

[51] Int. Cl.[5] ..... B32B 31/00

[52] U.S. Cl. ..... 156/294; 264/46.5; 264/262

[58] Field of Search ..... 156/294, 79; 264/46.5, 264/262; 138/97, 149, DIG. 2

[56] References Cited

U.S. PATENT DOCUMENTS

| | | | |
|---|---|---|---|
| 3,402,731 | 9/1968 | Martin | 138/149 |
| 4,049,480 | 9/1977 | Kutschke | 156/79 |

FOREIGN PATENT DOCUMENTS

| | | | |
|---|---|---|---|
| 0133575 | 10/1979 | Japan | 264/46.5 |
| 0082883 | 6/1980 | Japan | 156/294 |
| 0166240 | 12/1980 | Japan | 264/262 |
| 2023943 | 9/1982 | United Kingdom | 264/262 |
| 2123919 | 2/1984 | United Kingdom | 264/46.5 |

*Primary Examiner*—Robert L. Stoll
*Assistant Examiner*—Joseph D. Anthony

[57] ABSTRACT

A method for repairing corroded steel pipelines. Sections of fiberglass pipe are joined by means of internal collars to provide a length of pipe liner. The liner is inserted into a section of pipeline to be repaired. A hardening polymer, such as polyurethane elastomer, is then pumped into the annular space between the fiberglass pipe liner and the steel pipeline and allowed to cure in place.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

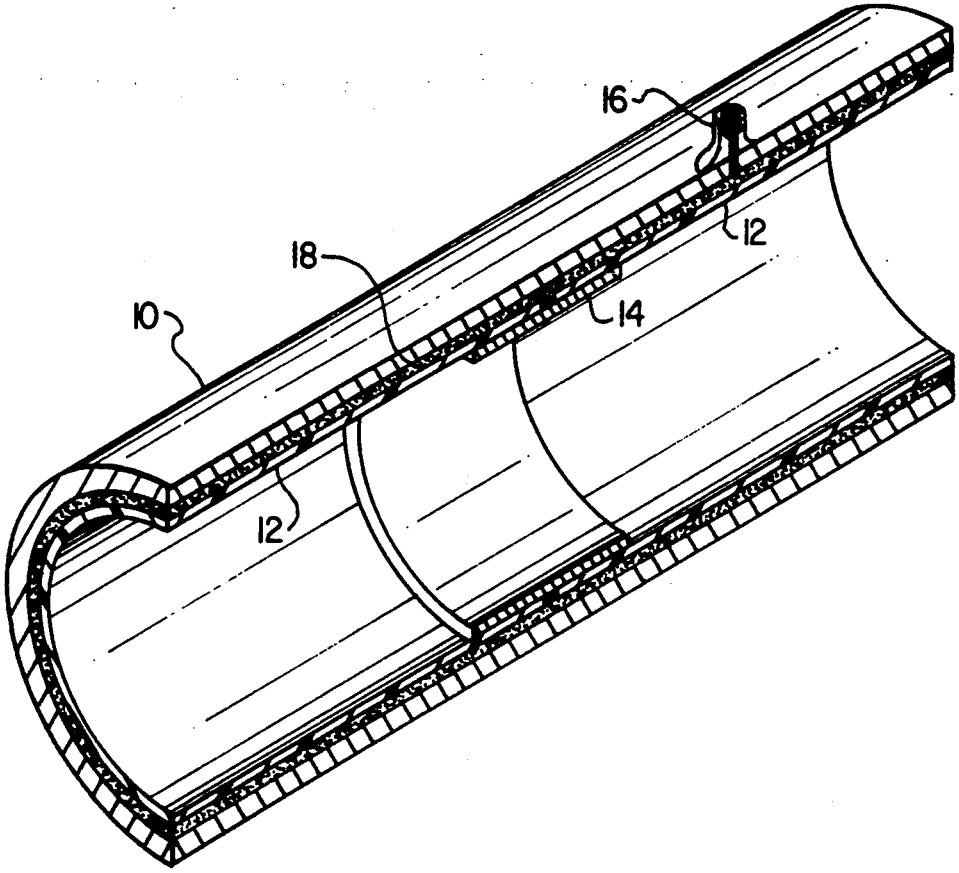
16
12
18
14
10
12

PIPELINE REPAIR METHOD

BACKGROUND OF THE INVENTION

The present invention relates to a method for repairing leaking or otherwise defective pipelines and more particularly to an improved method for lining steel pipelines with fiberglass pipe.

The facilities required for production of crude oil and related liquids include numerous pipelines. These range from small gathering lines running to and from individual wells to large cross-country pipelines used to transport the liquids over great distances. These pipelines represent a large part of the investment required to produce crude oil especially in remote areas such as northern Alaska. The useful life of these pipelines is generally limited by corrosion which eventually causes the pipelines to leak and/or to lose the strength required in high pressure service.

Numerous repair methods have been used to keep leaking or otherwise defective pipelines in service. The most obvious is to patch or simply replace defective sections of pipeline. Where pipelines are buried, such repair methods are difficult or at least very expensive. Where internal corrosion is the primary problem, various efforts to apply corrosion-resistant coatings, such as epoxy paint, on the internal surface have been attempted with varying degrees of success.

A more effective method has been to insert fiberglass pipe inside defective steel pipelines. Lengths of fiberglass pipe have been joined by conventional bell and spigot joints to form long lengths up to 1,000 feet or more. Other external joint methods such as the butt and wrap method, i.e., a wrap of fiberglass cloth and adhesive, have also been used. Fiberglass pipe has been found to have good strength qualities while being flexible enough to be pulled into existing pipelines, even around corners or curves. This repair method has included injection of cement grout, typically made from common portland cement, into the annular space between fiberglass pipe and steel pipeline. This repair method has been used commercially by Unisert Systems, Inc. of Houston, Texas, and is described in more detail in a paper entitled "Plastic Liners for Pipeline Rejuvenation", March 1984, by Benant E. Fruck of that company.

While this fiberglass pipe lining repair method has considerable advantages as compared with other known repair methods, it has certain disadvantages. Use of any pipe lining system necessarily reduces the inner diameter of the pipeline, thereby reducing its flow capacity. The wall thickness of fiberglass liners have therefore been kept to a minimum. However, use of external collars or any other external joint to connect sections of fiberglass pipe also effectively reduces the final pipeline inner diameter since the effective overall diameter at the joints must be small enough to allow the liner to be pulled into the existing steel pipeline. The use of common cement grout also requires that the maximum outer diameter of the liner be small enough to provide a sufficiently large annular space to allow pumping of the cement grout over long distances, 1,000 feet or more. While common cement grout has very good compressive strength, it has very little tensile strength and does not inherently bond to either the fiberglass liner or the steel pipeline. The cement grout does not inherently form a fluid-tight seal. It greatly increases the weight of the pipeline, which may be an advantage in subsea installations, but is a distinct disadvantage in other situations such as above-ground installations where the support systems may not have sufficient strength.

SUMMARY OF THE INVENTION

The present invention provides an improved method for repairing an existing pipeline. In accordance with the present invention, sections of fiberglass pipe liner are joined by internal collars, the joined sections are inserted into an existing pipeline and a hardening polymer is pumped into the annular space between the fiberglass pipe liner and existing pipeline. In one embodiment of the present invention, the hardening polymer is a foamed polyurethane material and provides thermal insulation as well as a light weight installation.

BRIEF DESCRIPTION OF THE DRAWING

The present invention may be better understood by reading the following detailed description of the preferred embodiment with reference to the accompanying drawing which is a cross-sectional illustration of a section of steel pipeline in which a fiberglass liner has been installed in accordance with the present invention.

DESCRIPTION OF THE PREFERRED EMBODIMENT

With reference to the figure, there is illustrated a section of steel pipe 10 which may be part of a typical pipeline. Within the illustrated section 10, there is positioned a length of fiberglass liner 12 including the ends of two fiberglass pipe sections joined by an internal collar or sleeve 14. Installed on pipe section 10 is a polymer injection port 16. In the annular space between liner 12 and pipeline 10 is positioned a hardened polymer material 18 which has been injected through the port 16. The polymer may be polyurethane foam, polyurethane elastomer, epoxy, or other similar materials.

As in prior known pipe lining methods, the precise dimensions of liner 12 depend on several factors. Its outer diameter must be small enough to pass through the smallest inner diameter of pipeline 10 occurring over the length of pipeline to be lined. In addition, the difference in diameters must provide a sufficiently large annular space 18 to allow injection of the grouting material over long lengths at reasonable pressures. The method of the present invention provides distinct advantages in selection of the outer diameter of liner 12. As compared to prior art methods, the outer diameter of liner pipe sections 12 can be greater by the thickness of the collar 14 which in the prior art methods has been an external collar. This also provides a smooth outer surface along the entire length of liner 12 which facilitates pulling long lengths of the liner into pipeline 10. The external joints used in the prior art caused flow restriction points which interfered with injection of the cement grout. This necessarily resulted in use of smaller diameter liner pipe to allow injection past the collars and thereby required the use of more grout over the length of the pipeline than would otherwise be required. In the present invention the annulus 18 is of constant dimensions over the length of the pipeline.

The use of hardening polymers, and in particular the polyurethane materials, also provides distinct advantages in sizing of liner 12 as compared to the prior art methods. The polyurethane materials are made by mixing a two-part system at a mixing head at the injection port 16. Immediately after mixing, these materials have a very low viscosity allowing them to be pumped rapidly into relatively small spaces at relatively low pressure. These materials therefore allow the annulus 18 to be smaller than is required for a conventional cement grout. While such hardening polymers are considerably more expensive on a per volume basis than cement grout, the increased cost is partly offset by the reduced volume required. If desired, the cost of the materials can be further reduced by use of a foamed polyurethane material which will simultaneously provide thermal insulation which is desirable in many cases.

The hardening polymers, especially the polyurethane elastomers, have other characteristics which give the method of the present invention a distinct advantage over the prior art cement grouting methods. For example, the polyurethane elastomers have very good adhesive properties and therefore will bond the fiberglass liner 12 permanently to the pipeline 10. The elastomer is oil resistant and forms a fluid-tight seal for any leaks which may be present in pipeline 10 or liner 12.

As illustrated and described above, the sections of fiberglass liner pipe 12 are joined by the internal sleeve 14. As the sections are joined, conventional adhesives are used to bond the outer surface of sleeve 14 to the inner surfaces of the ends of fiberglass pipe sections 12. While there is very little chance that a leak would occur in such a joint, the method of the present invention will fix or repair such a leak before the line is put in service. The injected polymer material will fill any space between the ends of pipe sections 12 and flow into any voids which occurred in the process of joining the liner pipe sections. Upon curing, the polymer will form a fluid-tight seal preventing any leakage from the pipeline.

As in the prior art method, other factors will also be considered in selecting the precise dimensions of liner 12. Thus, the wall thickness must be sufficient to provide the strength necessary to withstand the internal pressure to be applied to the pipeline. This thickness is, however, kept to a minimum to increase flexibility for pulling of the liner into the pipe 10 and to maximize internal diameter of the liner.

Having selected the fiberglass liner sections 12, the first step of the present invention is to join these sections by means of the internal collar or connection 14 to form a length of liner corresponding to the length of that portion of pipeline 10 which is to be repaired. One or more polymer injection ports 16 are installed on pipeline 10 to provide a means for pumping the hardening polymer into the annulus 18. The prepared liner section 12 is then pulled into the pipeline section 10 to be repaired. Once in place, the selected hardening polymer is injected through port 16 to rapidly fill the annulus 18. Once in place the polymer material will harden to its final design consistency and bond to the outer surface of liner 12 and the inner surface of pipeline 10.

While the present invention has been illustrated and described with reference to particular methods and materials, it is apparent that various modifications or changes may be made therein within the scope of the present invention as defined by the appended claims.

I claim:

1. A method for repairing a pipeline comprising:

joining sections of pipe comprising fiberglass with internal collars by bonding each collar to an interior surface of one section of fiberglass pipe and to an interior surface of another section of fiberglass pipe, inserting the joined sections into a pipeline, and pumping a hardening polymer into the annular space between the joined sections of fiberglass pipe and the pipeline.

2. The method of claim 1 further including:

attaching a polymer injection port to the pipeline and pumping said polymer into said annular space through said port.

3. The method of claim 1 wherein said polymer is selected from the group comprising polyurethane foam, polyurethane elastomer and epoxy.

* * * * *